Sept. 30, 1924.                    1,510,133
L. BREGUET
PROTECTING DEVICE FOR FUEL TANKS
Filed Oct. 26, 1922

Inventor
Louis Breguet
By Mauro, Cameron, Lewis & Kerkam
Attorneys

Patented Sept. 30, 1924.                                                        1,510,133

UNITED STATES PATENT OFFICE.

LOUIS BREGUET, OF PARIS, FRANCE, ASSIGNOR TO SOCIETE ANONYME DES ATELIERS D'AVIATION LOUIS BREGUET, OF PARIS, FRANCE.

PROTECTING DEVICE FOR FUEL TANKS.

Application filed October 26, 1922. Serial No. 597,227.

*To all whom it may concern:*

Be it known that I, LOUIS BREGUET, a citizen of France, and a resident of Paris, France, have invented new and useful Improvements in Protecting Devices for Fuel Tanks, which is fully set forth in the following specification.

It is for great advantage in the case of tanks used upon aircraft, motor vehicles, travelling track vehicles of armored type, and the like, containing an inflammable liquid such as gasoline, to afford protection of the same against shocks and also against leakage occasioned by the penetration of projectiles of small size such as bullets, fragments of shell or of grenades, and the like.

Known devices are in use consisting of a covering of rubber combined with a substance such as felt, leather, etc., so as to obviate the formation of rigid rough edges where the shot has passed through, but these devices have the disadvantage of producing side walls in the rubber whose length may be too great to allow them to close up.

The present invention consists essentially of a tank with two coverings between which is disposed a layer which avoids this disadvantage, said layer being formed by a substance rendered expansible by air or gas suitably compressed and contained in a plurality of cavities formed within the mass.

Figure 1:
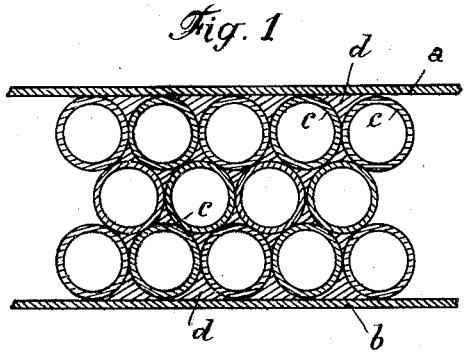
Fig. 1 is a cross section of the covering.
Figure 2:
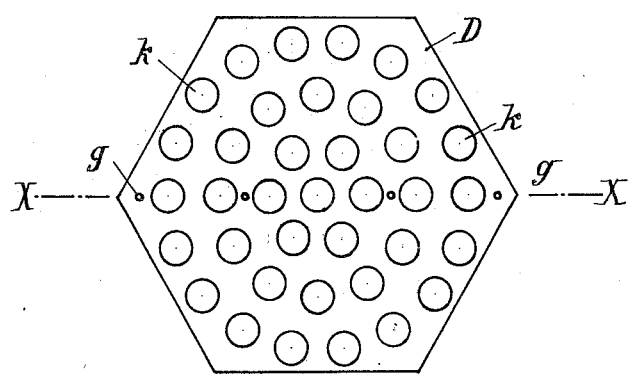
Fig. 2 is a front view of a slab.

Various means may be used to produce such material. One method consists in disposing between the two coverings $a$ and $b$ of the tank (as shown in the diagrammatic cross-section, Fig. 1), a plurality of small hollow rubber balls $c$ of a thin and elastic nature, having for example from 5 to 10 millimeters diameter, said balls having been filled with air or gas at a pressure higher than atmospheric pressure. The said balls are well stowed in place, and the whole is agglomerated by pouring in a rubber solution $d$ which solidifies by evaporation.

Figure 3:
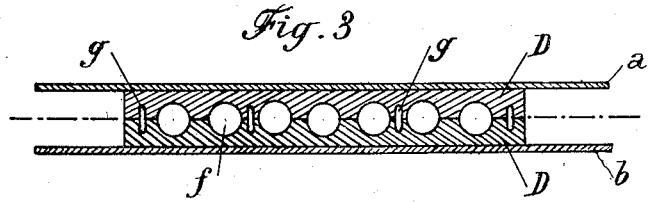
Fig. 3 is a cross section on line X—X of Fig. 2.

Another method consists in preparing the said material in the first place, in the form of sheets which are made up of the balls $c$ agglomerated in the manner set forth, or as sheets which are composed of slabs having the form of a regular polygon (equilateral triangle, square, lozenge, hexagon, etc.) assembled after the manner of tiling and caused to adhere together; said slabs can be each constituted by two halves D, D, as shown in front view in Fig. 3 and in cross-section on the line X—X of Fig. 3; the halves are cemented together and are provided on the inner face with the plurality of hemispherical recesses $k$. During the cementing process, the slabs are exactly matched by means of studs $g$, thereby obtaining the fluid-tight spherical pockets $f$, as shown in Fig. 3 which is a cross-section of the protecting device as thus obtained.

When carrying out the operations of introducing and stowing of the balls between the coverings $a$, $b$, or of making up the assembled sheets, this is to be performed in closed chambers at a pressure above atmospheric pressure, and in this manner the air contained in said balls or spherical cavities will be under a certain pressure, thereby increasing the elasticity of the resulting material.

It will be observed that a hole produced in the said material and in the metal coverings will be at once closed by the expansion of the material.

Figure 4:
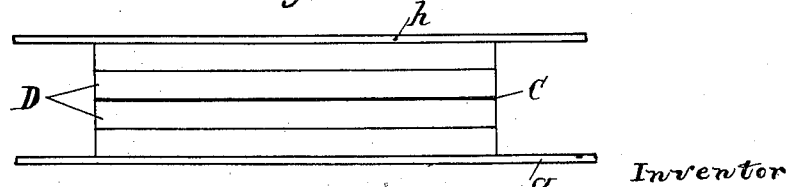
Fig. 4 shows a plurality of superposed sheets.

If the expansible material is prepared in the form of sheets, the protection can be carried out by directly placing on the covering $q$ of the tank a single sheet or a plurality of superposed sheets D, Fig. 4, and the same can be cemented together by rubber solution, as shewn at C. In this case the metal covering $h$, for example of sheet aluminum, surrounds the whole of the protecting material and is maintained by hoops in a tight or loose position.

Any other suitable methods can be used for constituting an artificial product having rubber as a base and containing various fluid-tight cavities or pockets which are properly filled with air or gas under pressure.

What I claim is:

1. A protecting device for tanks and chiefly for tanks containing an inflammable liquid, characterized by an entire and direct covering formed of an expansible substance having rubber as a base and serving by its expansion to close up the hole caused by the firing of a projectile, said substance being made expansible by the use of fluid-tight cavities containing a gas under pressure, the said covering material being held in place by an external metallic envelope.

2. A protecting device for tanks, particularly tanks containing an inflammable liquid, comprising a covering of expansible material constituted by a plurality of balls containing a fluid under pressure and embedded in rubber.

In testimony whereof I have signed this specification.

LOUIS BREGUET.